US011890777B2

(12) United States Patent

Huet

(10) Patent No.: US 11,890,777 B2
(45) Date of Patent: Feb. 6, 2024

(54) REMOVABLY ENGAGEABLE ROPE GUARD

(71) Applicant: Brett Huet, Bend, OR (US)

(72) Inventor: Brett Huet, Bend, OR (US)

( * ) Notice: Subject to any disclaimer, the term of this patent is extended or adjusted under 35 U.S.C. 154(b) by 493 days.

(21) Appl. No.: 16/813,286

(22) Filed: Mar. 9, 2020

(65) Prior Publication Data

US 2020/0291573 A1 Sep. 17, 2020

Related U.S. Application Data

(60) Provisional application No. 62/817,976, filed on Mar. 13, 2019.

(51) Int. Cl.
*B27G 19/00* (2006.01)
*B27B 17/02* (2006.01)

(52) U.S. Cl.
CPC ............ *B27G 19/003* (2013.01); *B27B 17/02* (2013.01); *D07B 2501/2038* (2013.01)

(58) Field of Classification Search
None
See application file for complete search history.

(56) References Cited

U.S. PATENT DOCUMENTS

| | | | | |
|---|---|---|---|---|
| 10,213,649 B2 * | 2/2019 | Norton | ................. | A63B 29/028 |
| 2002/0170728 A1 * | 11/2002 | Holland | ............... | H02G 3/0481 174/19 |
| 2011/0091682 A1 * | 4/2011 | Holland | .................... | B32B 5/22 24/442 |
| 2016/0279477 A1 * | 9/2016 | Petty | .................... | A63B 29/028 |
| 2020/0291573 A1 * | 9/2020 | Huet | ....................... | B66C 1/122 |

FOREIGN PATENT DOCUMENTS

| | | | | |
|---|---|---|---|---|
| EP | 2 918 539 | A1 | * | 9/2015 |
| GB | 2503555 | B | * | 6/2015 |
| GB | 2546091 | A | * | 7/2017 |
| WO | WO 2019/231946 | A1 | * | 12/2019 |

* cited by examiner

*Primary Examiner* — Hwei-Siu C Payer
(74) *Attorney, Agent, or Firm* — Donn K. Harms

(57) ABSTRACT

A rope severing guard is engageable around a rope or flexible member to protect it from severing by a chainsaw cutting chain. The guard has a flexible body having a rope passage through which a protected rope is positioned. An interior cavity in the body of the rope severing guard is filled flexible fibers which if contacted by a moving cutting chain of a chainsaw, will form clogging engagements with the cutting chain and the chain support it moves upon or with the cutting chain and the motor drive gear powering it.

6 Claims, 4 Drawing Sheets

REMOVABLY ENGAGEABLE ROPE GUARD

FIELD OF THE INVENTION

This application claims priority to U.S. Provisional Patent Application Ser. No. 62/817,976 filed on Mar. 13, 2019 which is incorporated herein in its entirety by this reference thereto.

The disclosed device concerns a rope guard for preventing accidental severing of a rope. More particularly, it relates to a removably engageable flexible rope guard configured with internally housed elongated fibers configured to instantly seize the movement of a cutting chain of a chainsaw upon contact therewith, to prevent accidental severing of ropes employed during tree cutting.

BACKGROUND OF THE INVENTION

In the field of tree pruning and removal, where larger trees are concerned, workers frequently employ a chainsaw to cut both limbs of the tree as well as the trunk. In cases where the tree being trimmed or removed is tall, it is common for arborists and professional tree services, to remove the taller tree in segments, especially in crowded commercial or residential areas where felling the tree could cause property damage or injury.

Where such trimming occurs at elevated heights in the tree, workers conventionally employ ropes for personal safety to prevent them from falling, should they slip at a high elevation in the tree. Additionally, tools may be provided to the workers engaged to ropes so they may be safely used and raised and lowered as needed.

Such tree trimming and sequential felling conventionally employs a chainsaw in the cutting of branches as well at portions of the tree trunk during the trimming or felling process. As can be discerned, the use of a chainsaw which cuts easily through wood, is a significant hazard since the same chainsaw will cut effortlessly through ropes employed by workers for safety and which may be engaged to various tools they may be using, or may be connected to branches being cut, to insure a proper landing once cut.

Currently, workers must be highly vigilant during employment of the chainsaw while cutting or pruning a tree to make very sure they do not cut the rope or ropes holding them elevated in the tree or which are being used to hold tools or branches during the cutting process. However, even where workers pay keen attention, it is easy to lose sight of the rope or ropes in the branch environment of the tree, or where the rope may be positioned behind a limb they are trimming.

The device and method herein is formed of a flexible textile body adapted for an easy surrounding engagement of a rope. So positioned, should the cutting chain of a chainsaw encounter the device during protection of a rope, the chain will be substantially, instantly, seized before the rope is damaged or cut.

The forgoing examples of tree pruning and trimming with chainsaws in the proximity of safety and work ropes, and issues regarding such are intended to be illustrative and not exclusive, and they do not imply any limitations on the invention described and claimed herein. Various other limitations of the related art are known or will become apparent to those skilled in the art upon a reading and understanding of the specification below and the accompanying drawings.

SUMMARY OF THE INVENTION

In industries and occupations where cutting tools are employed, such as trimming of trees or building erection and repairs, conventionally safety ropes for workers and working ropes to hoist and hold tools are employed. Due to the use of such flexible members and ropes in proximity to power cutting tools, such as chainsaws and reciprocating saws and the like, it becomes overly easy to accidentally sever one of the ropes.

The disclosed guard device is portable, reusable, and configured to easily surround and protect a rope, or flexible belt, or other flexible member being employed in proximity to such power cutting tools. The device has a textile body which is formed of a flexible material which is sufficiently flexible to fold in half to surround the rope or flexible member to be protected. This body of the device is preferably manufactured from a woven or non woven textile fabric or similar material. Such may be sewn or otherwise formed to form a body having flexible sidewalls which define and surround an interior cavity. The interior cavity is configured for holding elongated fibers or threads therein. These fibers or threads may be positioned by themselves withing the cavity and curled or otherwise packed into the cavity in lengths which exceed that of the cavity.

In a particularly preferred mode of the device, enabling both an increase in the length and an increase in the number of such fibers so held, which also allows for easy replacement thereof, a flexible scrim has the elongated fibers engaged therewith. By flexible scrim is meant a flexible planar sheet of material formed of woven or non woven material, through which the elongated fibers can be engaged therewith.

The engagement of the individual elongated fibers, can be by a communication of the individual elongated fibers through the scrim, or by adherence of one or both ends of such elongated fibers to the opposing surfaces of the scrim such as with adhesive or fasteners. This scrim and looped elongated fiber configuration allows for a folding of the flexible scrim with elongated fibers in loops extending from both sides of the scrim, to be placed in layers into the interior cavity. It also allows for each replacement by simply inserting a new scrim with loops of elongated fiber engaged, in place of one which is removed. Using multiple layers of scrim with elongated fibers so engaged, more of the elongated fibers can be packed within the interior cavity of the body as the elongated fiber loops are compressed in-between the scrim layers. Further, it significantly increases the number of loops of the elongated fibers available to catch the chain mechanism and cease movement because the layers can be compressed to form layers of looped elongated fibers compressed between layers of scrim.

By elongated fiber herein is meant, spunbound, twisted, untwisted, or extruded, yarn, thread, or fiber, formed in single strands or multiple strands of one or more fiber materials from a group of fiber materials including nylon, polyester, cotton, metal, rayon, silk, wool, and KEVLAR in a diameter between 0.015 inches which has a 2.5 pound breaking strength to 0.040 inches in diameter with a 53 pound breaking strength. Other elongated fiber material that matches or exceeds the breaking strengths in the respective diameters noted above, can also be used.

The choice of diameter and breaking strength of the elongated fibers should be matched to the horsepower of the motor or engine driving the cutting chain. It has been found that elongated threads of a thinner diameter were more easily pulled into the small space between the chain engaged into a recess on a guide bar in a well known configuration. However, with chainsaws of higher horsepower or with longer guide bars extending from the driving motor or engine, thicker diameter elongated fiber from the range may be desirable. For a configuration configured for both low and high powered chainsaws, a plurality of elongated fibers of differing diameters can be employed. This will position a plurality of loops or elongated sections of the elongated fibers where each has a differing diameter within a range of 0.01 inches to 0.5 inches, which insures that one or more of the elongated fibers will be of a diameter that slips between the chain and the guide bar and is pulled to a position on the guide bar that jams or ceases movement.

In environments where the elongated fibers will be exposed to sunlight, which is most, the woven or unwoven material forming the body of the device defining the interior cavity will preferably communicate little or no sunlight through the material. Or, a light fabric blocking layer may be positioned on the interior surface surrounding the interior cavity to block any communication of sunlight which can damage the elongated fibers. Such, for example, may be black or reflecting polyethylene or polypropylene sheeting positioned to surround the internal cavity.

So engaged to a flexible scrim, a plurality of such scrims with the elongated fibers engaged therewith, can be positioned in layers within the interior cavity. Using this scrim with engaged elongated fibers mode of the device, significantly more such elongated fibers can be packed into the interior cavity since they are compressed in layers of such elongated fibers sandwiched between rows of the scrim holding the elongated fibers. Where a slight contact of a chain with the sidewall causes a pulling of fibers from the interior cavity, the scrim holding the layer of elongated fibers can be replaced, and any small hole in the sidewall patched either by sewing, gluing, or placing a cover layer over the cut that is adhesively engaged.

In all modes of the device herein, upon any severing of the flexible sidewall of the body material surrounding the cavity, the elongated threads or fibers therein, are immediately pulled into the mechanism of the power cutting tool, causing an immediate cessation of cutting movement. By elongated fibers is meant threads, yarns or extruded fibers, or the like, in a length of substantially at least one inch but more preferably substantially between two and twenty inches long. While experimentation has shown that shorter elongated fibers between one inch and five inches will jam the chain mechanism and cease movement of the cutting chain of a chainsaw, elongated fibers of a longer nature, such as substantially between three to ten inches or longer, stopped the movement quicker. However, when the device is employed with a chainsaw having a longer guide bar, the elongated fibers in the longer end of the noted range may work better.

The body of the rope guard device herein, is formed in a manner allowing for easy engagement around and removal from the rope or flexible member to be protected. In this configuration, the device is easily employed and moved between an engaged position surrounding the flexible member to be protected, to a disengaged position where it may be stored for the next use.

As described herein, the body of the device features a configuration where it is foldable to allow it to wrap around and surround the rope or flexible member needing severing protection. Mating fasteners on each of two halves of the folding body, are removably engageable to hold the body in a folded position surrounding a rope or flexible member. Disengagement of the fasteners allows for removal of the protected rope or flexible member from the surrounding engagement provided by the device herein.

The body of the device may be formed of woven or unwoven fabric and sewn or otherwise adhered to form a body size and configuration to hold the elongated fibers or the scrim with looped fibers extending from opposing surfaces. The body using the woven or unwoven fabric may be formed using fabric sections engaged together with sewing, adhesive or sonic welding or other conventional fabric engagement means. The elongated fibers, as well as the fabric or material forming the sidewalls of the body as noted above, can be KEVLAR, nylon, flexible glass, polypropylene, polyethylene, or other natural or synthetic fabrics adapted to the task of jamming the mechanics of the powered cutting blade or chain and causing an immediate cessation of operation thereof.

With respect to the above description, before explaining at least one preferred embodiment of the herein disclosed removably engageable rope guard invention in detail, it is to be understood that the invention is not limited in its application to the details of construction and to the arrangement of the components in the following description or illustrated in the drawings. The invention herein described and shown is capable of other embodiments and of being practiced and carried out in various other ways by those skilled in the art upon reading this disclosure. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other removably engageable rope guards for protection of ropes from chainsaw cutting blades, and for carrying out the several purposes of the present disclosed device. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements. The term "substantially" when employed herein, means plus or minus twenty percent, unless otherwise designated in range.

It is an object of the present invention to provide an easily removably engageable flexible member or rope guard, which will prevent the accidental severing of a rope during its use in the proximity of a chainsaw.

It is a further object of this invention, to provide such a rope guard device, which employs elongated flexible fibers positioned within an interior cavity of a flexible body, which when contacted by a chain cutting assembly, will immediately be drawn into the assembly and cease movement of the chain.

These and other objects, features, and advantages of the present rope guard system, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF DRAWING FIGURES

The accompanying drawings, which are incorporated herein and form a part of the specification, illustrate some, but not the only or exclusive examples of embodiments and/or features of the disclosed removably engageable rope guard system and method herein. It is intended that the embodiments and figures disclosed herein are to be considered illustrative of the invention herein, rather than limiting in any fashion.

In the drawings:

FIG. 9 shows a sectional of the device having the scrim and loop configuration of FIG. 8, engaged around a rope in a similar fashion to FIG. 4, showing the layers of scrim having loops of elongated fibers in-between.

DETAILED DESCRIPTION OF THE INVENTION

Figure 1:
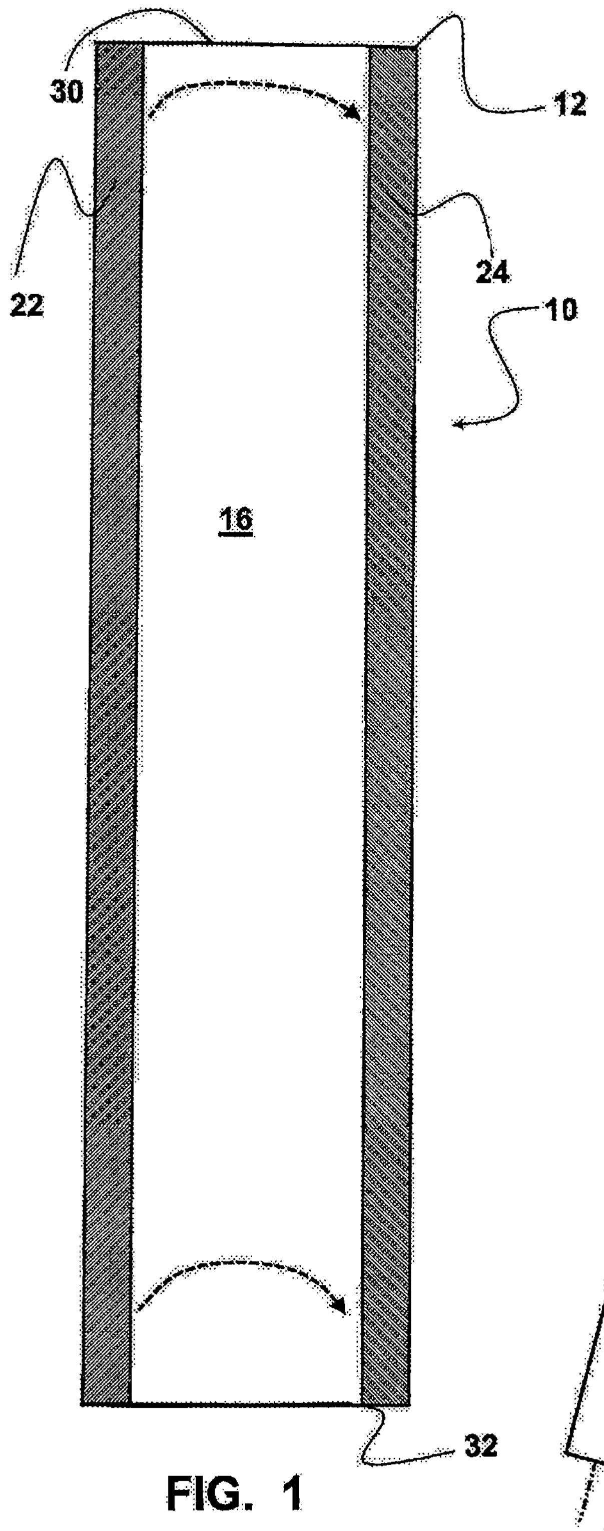
FIG. 1 depicts an overhead view of the exterior of the body of the rope guard device herein having cooperatively engageable fasteners on two sides to hold it folded around a rope such as in FIG. 2.

In this description, the directional prepositions of up, upwardly, down, downwardly, front, back, top, upper, bottom, lower, left, right and other such terms refer to the device as it is oriented and appears in the drawings and are used for convenience only and such are not intended to be limiting or to imply that the device has to be used or positioned in any particular orientation.

Figure 2:
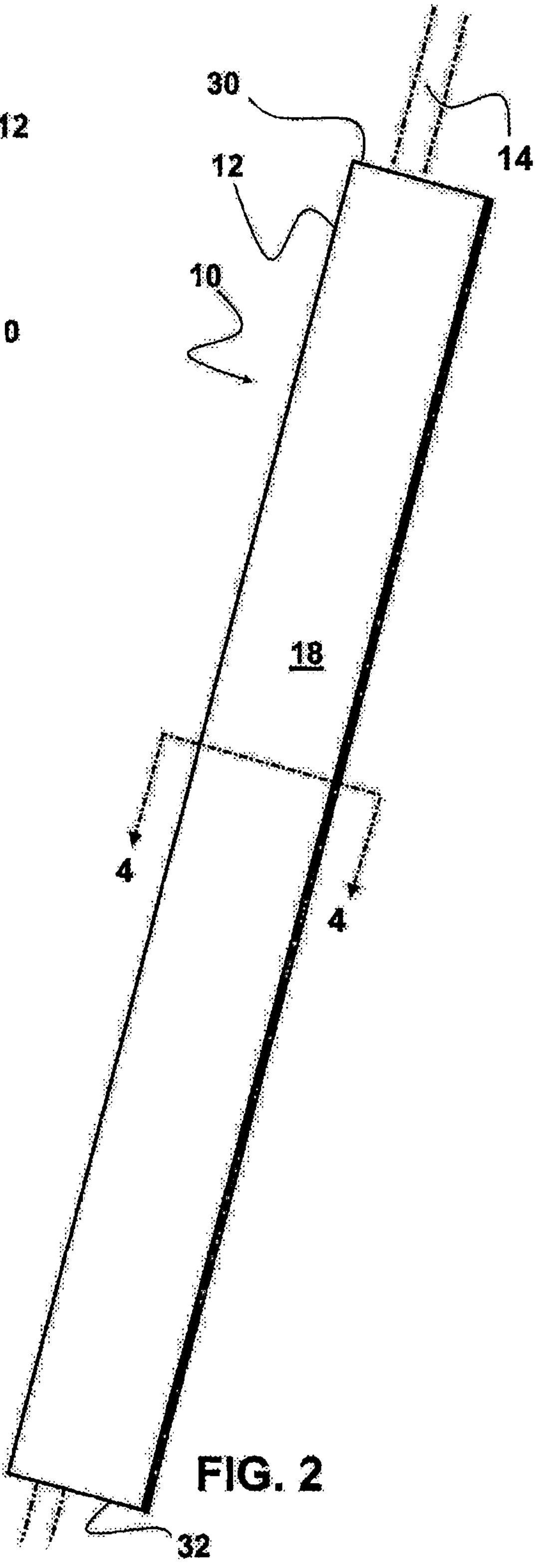
FIG. 2 shows an exterior surface of the body of the rope guard device of FIG. 1, held in a removable engagement by the fasteners positioned on opposing sided edges, where it surrounds a flexible member or rope running through the folded body.

Now referring to drawings in FIGS. 1-9, wherein similar components are identified by like reference numerals, there is seen in FIGS. 1 and 2, the device 10 has a body 12 formed of a flexible woven or unwoven material 11. The body 12, as noted is sewn or otherwise configured of sections of material 11 to form the body 12.

As formed, the body 12 is adapted to fold in half to surround a flexible member that can be easily cut, such as a rope 14 or similar flexible member, which is to be protected from severing. The use of rope 14 herein is for convenience but is intended to cover other severable flexible members employed for safety lines and the like.

The material 11 forming the body 12 is formed of a woven or non woven textile fabric, or could be formed from another material which can be configured with a first side surface 16 engaged to a second side surface 18. The body 12 once constructed of the layer of material 11, has an interior cavity 20 (FIG. 4) which is formed in-between the first side surface 16 or sidewall and second side surface 18 or second sidewall.

As can be seen in FIGS. 1-2, the body 12 is configured to move from a disengaged position of FIG. 1, to an engaged position of FIG. 2 where it is held folded by a first mating fastener 22 which is removably engageable with a second mating fastener 24. As depicted, the first mating fastener 22 and second mating fastener 24 are shown as hook and loop fabric material, but they can be any pairing of cooperatively engageable fasteners. One skilled in the art may find in, for example, the GRAINGER catalog, fasteners such as snaps, buttons, magnets, and hooks.

Figure 3:
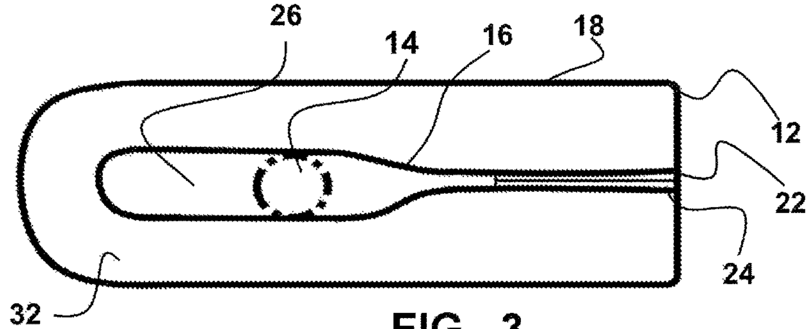
FIG. 3 shows an end view of the body of the device as in FIG. 2.
Figure 4:
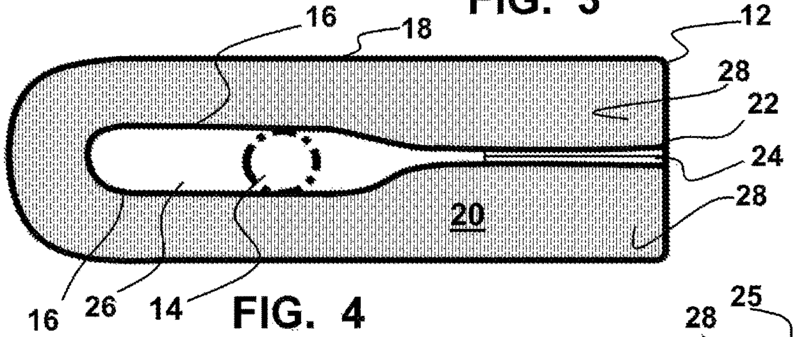
FIG. 4 shows a sectional view of the device of FIG. 2 along line 4-4, showing the body of the device having elongated fibers running the length between a first and second end.

As shown in FIGS. 3-4, when the body 12 of the device 10 moved to the folded position of FIG. 2, from the unfolded position of FIG. 1, it may be wrapped around the rope 14 such that the rope 14 is protected from severing within a formed passage 26 formed by the surrounding first side surface 16. The second side surface 18 in this folded configuration forms the outside of the folded device 10. This positioning can of course be reversed depending on the construction and positioning of the separable fasteners.

Also as can be seen in the sectional view of FIG. 4, the internal cavity 20, is filled with elongated flexible fibers 28 which are positioned within the interior cavity 20. The flexible fibers 28, in all modes of the device 10, preferably extend between respective first and second ends thereof, which extend between, and have portions thereof which are positioned adjacent to, a respective first end 30 and second end 32 of the body 12 of the device 10. The flexible fibers 28 thus have a length which is at least substantially equal to a length of the body 12 between the first end 30 and second end 32 thereof. However, the fibers 28 can also be longer than the length of the body 12 and positioned within the interior cavity 20 in a serpentine or other looped or winding fashion allowing for the flexible fibers 28 to be oversized compared to the length of the body 12.

The material 11 forming the body 12 and the first side surface 16 and second side surface 18 thereof, can be sewn or sonically welded, or glued, or otherwise engaged from sections of the material 11, to form the body 12 with an interior cavity 20. Because of the potential for wet working conditions for the device 10, the material forming the first side surface 16 and second side surface 18 may be formed of fluid repelling material such as rip-stop nylon or polyester, waterproof canvas, or other materials which will substantially maintain the interior cavity 20 dry, to keep the elongated fibers 28 dry also.

While it is noted that a woven or non-woven textile fabric is preferred for the body 12 due to the durability thereof, other materials might also be employed such as polymer coated or laminated materials having a mesh or scrim interior support material providing strength to which the polymer layer is adhered to provide a fluid proof coating to the body 12.

Figure 5:
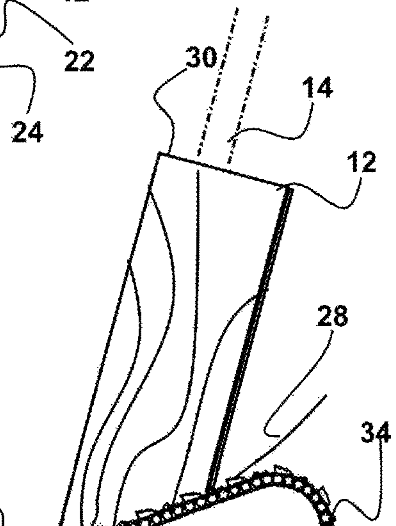
FIG. 5 shows the device as in FIG. 2, wherein a chainsaw chain blade running on a guide, has severed the exterior surface of the material forming the body of the device and been ensnared and substantially instantly seized from further cutting motion around the track of the guide bar extending from the motor or engine powering the chainsaw.
Figure 5:
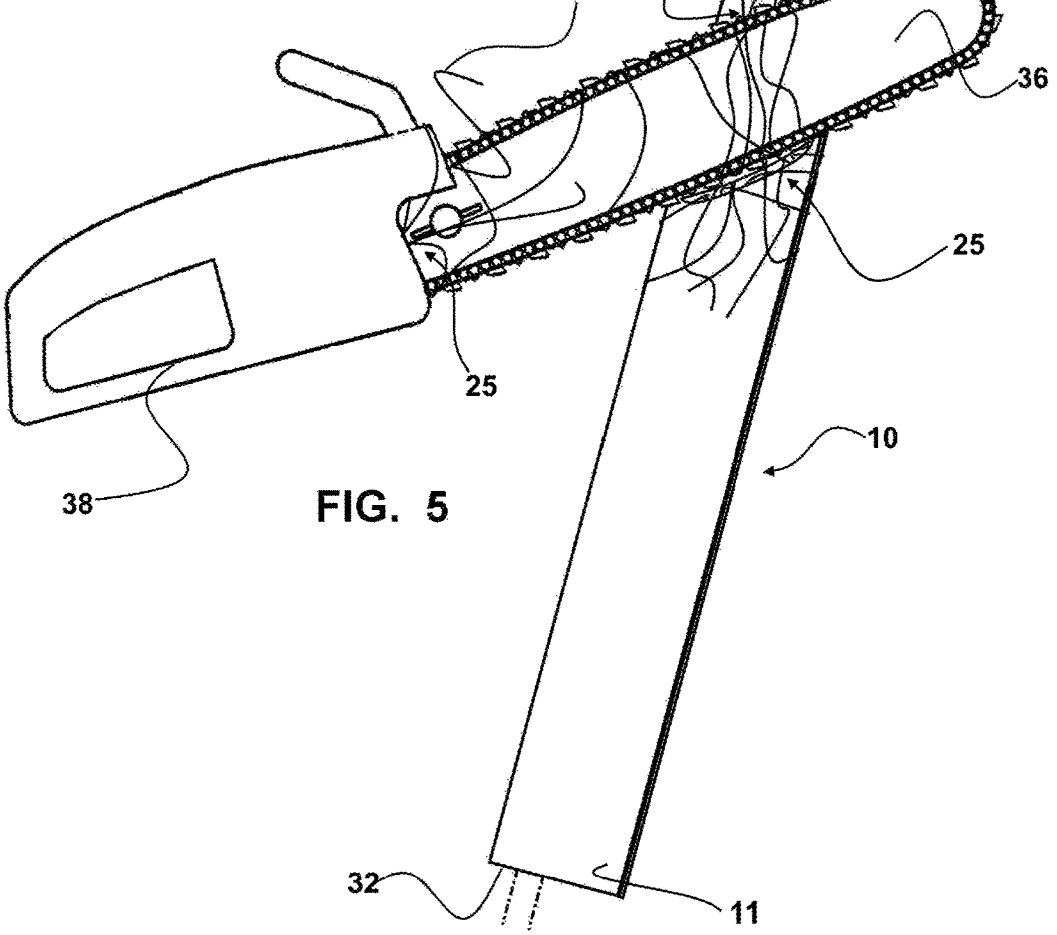

As can be seen in FIG. 5, which depicts the device 10 engaged to protect severing of a rope 14, during use of a chainsaw 38, the elongated flexible fibers 28 located within the interior cavity 20, are particularly preferred in all modes of the device 10. This works especially well to allow the fibers 28 to immediately engage with and wrap around and in-between the cutting chain 34 blade and the chain bar 36 of a chainsaw 38, should the cutting chain 34 sever through the material 11 and second surface 18 of the body 12 of the device 10.

Upon such a severing by the chain blade 34, the thin fibers 28 formed in lengths and diameters noted above, engage with and between the links and teeth on the chain blade 34 and the chain bar 36. The sliding motion of the chain blade 34 causes the plurality of fibers 28 to form a clogging engagement 25. By clogging engagement 25 is meant that the moving chain blade 34 grabs a plurality of the fibers 28 or portions thereof, which are caught upon the chain blade 34 and immediately are pulled from the interior cavity 20 to wrap around and in-between the chain blade 34 and underlying chain bar 36, as well as in-between a drive gear of the chainsaw 38 and the chain blade 34, which is powering the rotation of the chain blade 34 on the chain bar 36.

This clogging engagement 25 of the fibers 28 with the chain blade 34, drive gear, and chain bar 36, substantially instantaneously ceases movement of the chain blade 34 on the chain bar 36, and thereby the ability of the chain blade 34 to cut any further. Consequently, upon the unfortunate occurrence of the user of the chainsaw 38 positioning the chainsaw to where the chain blade 34 actually contacts and cuts through the material 11 and one of the first side surface or second side surface 18 of the body 12, depending on how it is engaged, the resulting severing will position the chain blade 34 within the interior cavity 20 and cause a plurality of the supply of fibers 28 therein, to be pulled by the chain blade 34. The fibers 28 and portions thereof, are pulled by the chain blade 34 to form one or a plurality of clogging engagements 25, between the chain blade 34 and chain bar 36, and/or the connection of the chain blade 34 and motor-engaged drive gear (not shown but well known).

The formed clogging engagements 25, jam any further movement of the chain blade 34 around the chain bar 36, substantially instantaneously, whereby cutting ceases. As noted, the plurality of flexible fibers 28 and/or portions thereof pulled into each clogging engagement 25, combines multiple flexible fiber 28 sections to thereby multiply the combined tensile strength of each clogging engagement 25, by the number of flexible fiber portions forming it. Thus, for example, in no way limiting, ten sections of flexible fiber 28 with a twenty pound tensile strength can combine in a clogging engagement 25 to form two hundred pounds of tensile strength to stop a moving chain blade 34.

While the user will be required to remove the clogging engagement 25 formed of the elongated fibers 28 from the chain blade 34 and chainsaw 38 and drive gear therein, the area of the rope 14 being protected by the device 10 will remain un-severed. Should this be a safety rope or tool or weight bearing rope 14 the safety of the user and surrounding persons and structure is maintained, instead of the rope 14 being severed which as noted can cause injury and property damage.

The fibers 28 are best formed of very thin elongated yarn or thread or monofilament material as noted above, with sufficient tensile strength to stop movement of the chain blade 34 once engaged therewith in a clogging engagement 25. Because of the numerous number of such fibers 28 drawn into a clogging engagement, the tensile strength of each is multiplied by the number pulled into the clogging engagement 25. The fibers for example can be KEVLAR, nylon, metal, polypropylene, polyethylene, or other natural or synthetic fabrics, so long as testing or a calculation is done to assure that once the chosen elongated flexible fibers 28 engage with the chain blade 34, they jam movement thereof and prevent any cutting or severing below the layer of fibers 28 occupying the interior cavity 20 of the body 12 of the device 10. As noted, larger chainsaws with more horsepower will require fibers 28 having a higher tensile strength from the range of such elongated fibers 28 described above.

Figure 6:
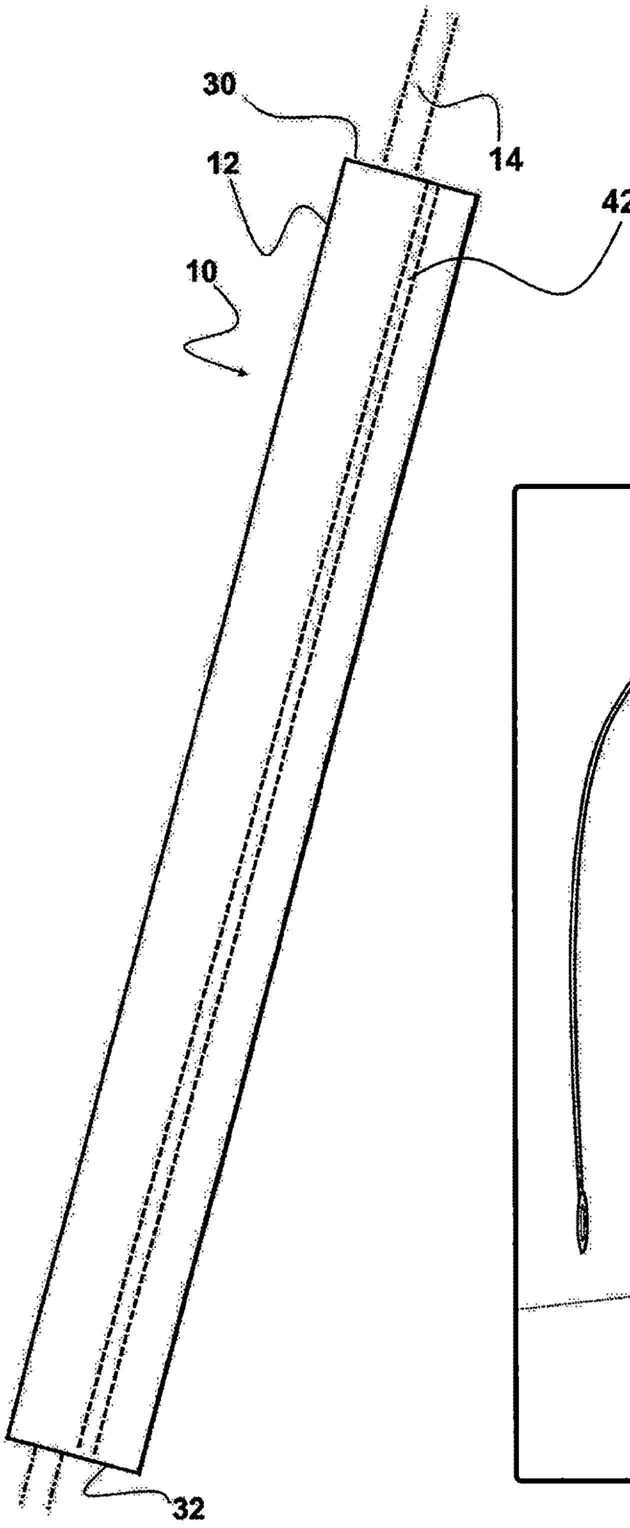
FIG. 6 shows the device sewn into a tube configuration which has been slid upon the flexible member or rope from one end.

Shown in FIG. 6, is the device 10, formed with the body 12 formed in a conduit or tube configuration. As shown the body 12, has had the material 11 connected by sewing 42 to form a tube like configuration which has been slid upon the flexible member or rope 14 from one end.

Figure 7:
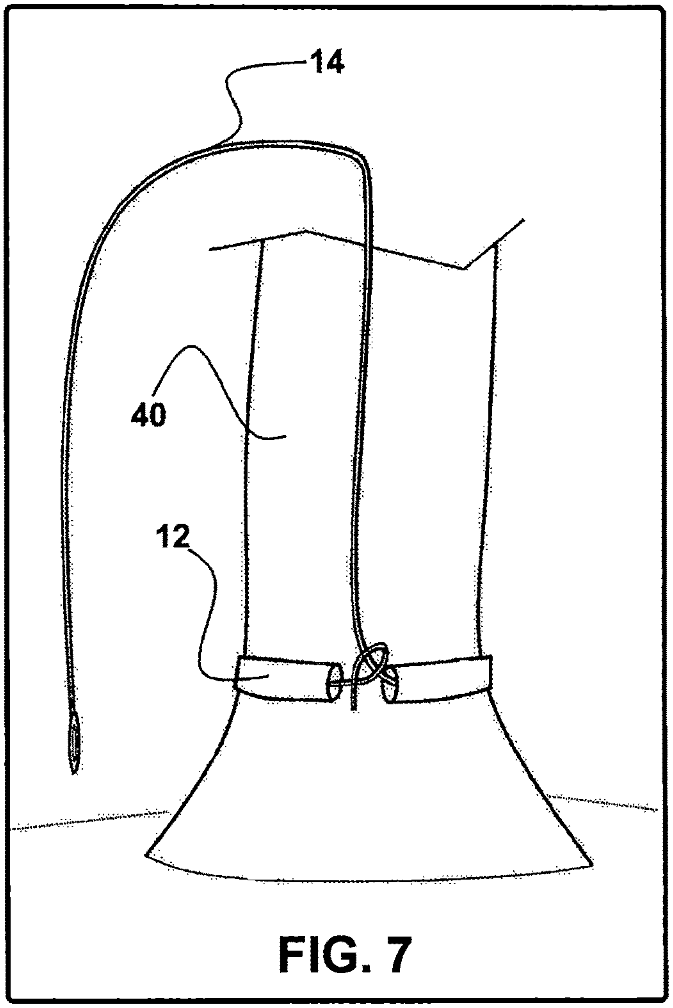
FIG. 7 shows a mode of the device employed to protect a flexible member or rope engaged around a tree which is a common safety rope positioning.

In FIG. 7 is shown a mode of the device 10 employed to protect a flexible member or rope 14 which is engaged around a tree 40 which is a common safety rope positioning. This engagement will protect the safety rope 14 from cutting by the ground crew.

Figure 8:
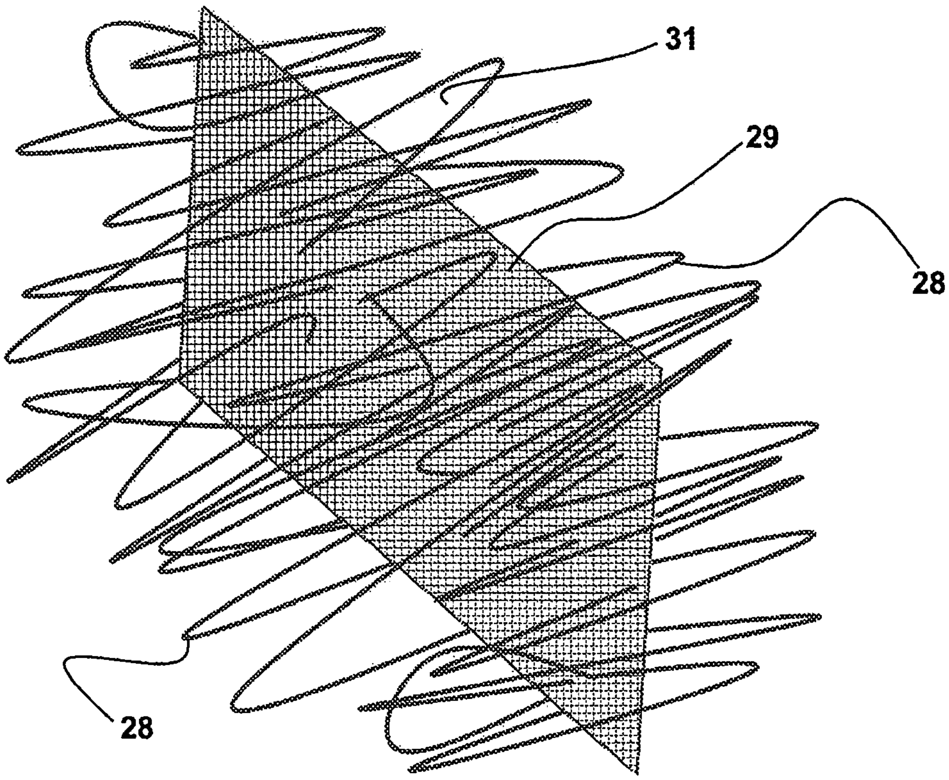
FIG. 8 shows the elongated fibers engaged to at least one side and preferably both sides of a scrim material which may be stacked within the cavity of the device to increase the amount of loop of elongated fibers which are positioned for engagement with an errant cutting chain.

Shown in FIG. 8, the elongated fibers 28 are engaged to at least one side and preferably both sides of a sheet of scrim 29 material. In this configuration, multiple layers of scrim 29 material with the loops extending from at least one side and preferably both sides of the scrim 29 material, may be stacked or folded within the interior cavity 20 of the device 10. As noted, this increases the amount and number of fibers 28 in the interior cavity 20 due to a slight compression between scrim 29 layers. Further, in this configuration with a scrim 29, the fibers 28 can be formed into loops 31 of elongated fibers 28. which have been found in experimentation to work as well or better than simply positioning of the fibers 28 in elongated sections extending to a distal end, which of course also works well to stop the chain.

Figure 9:
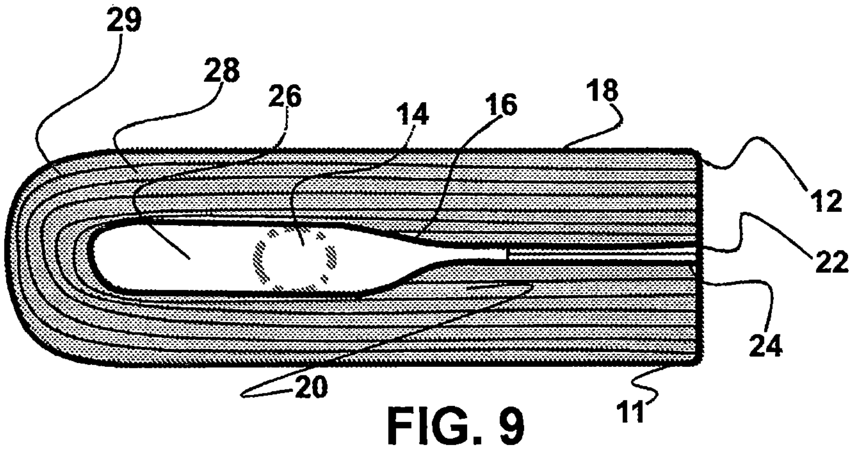

Depicted in FIG. 9, which is a sectional view through the body of the device 10, are layers of scrim 29 having lengths or loops 31 of elongated fibers 28 engaged to at least one, and preferably both side surfaces of the scrim 29, which are positioned in between the scrim 29 layers. The elongated fibers 28 so positioned, are compacted and allow for substantially more of the elongated fibers 28 to be positioned in this stacked configuration in the interior cavity 20. The lengths of fibers 28 extending from engagements to a scrim 29, may be loops 32 or lengths just extending to a distal end.

It should be noted that any of the different depicted and described configurations and components of the rope guard and severing prevention device herein, can be employed with any other configuration or component shown and described as part of the device herein. Additionally, while the present invention has been described herein with reference to particular embodiments thereof and/or steps in the method of production or use, a latitude of modifications, various changes and substitutions are intended in the foregoing disclosure, and it will be appreciated that in some instance some features, or configurations, of the invention could be employed without a corresponding use of other features without departing from the scope of the invention as set forth in the following claims.

What is claimed is:

1. A rope severing guard apparatus, comprising:

a body, said body having a first side surface formed of flexible material and a second side surface formed of said flexible material opposite the first side surface;

an interior cavity formed between said first side surface and said second side surface;

said interior cavity extending for a length in-between a first end of said flexible body and a second end of said flexible body;

said interior cavity filled with a plurality of elongated fibers;

said flexible body positionable to a folded configuration;

said flexible body in said folded configuration forming a passage running therethrough, from said first end of said body to said second end of said body;

said passage configured for positioning of a rope therein;

said elongated fibers positioned in said interior cavity when placed in a communication with a moving cutting chain of a chainsaw which has severed said flexible material forming said first side surface or said second side surface of said body, forming one or a plurality of clogging engagements with said cutting chain, whereby each said clogging engagement prevents further movement of said cutting chain;

mating fasteners positioned on said flexible body, said mating fasteners positionable to a removable engagement with each other; and said removable engagement holding said flexible body in said folded configuration.

2. A rope severing guard apparatus, comprising:

a body, said body having a first side surface formed of flexible material and a second side surface formed of said flexible material opposite the first side surface;

an interior cavity formed between said first side surface and said second side surface;

said interior cavity extending for a length in-between a first end of said flexible body and a second end of said flexible body;

said interior cavity filled with a plurality of elongated fibers;

said flexible body positionable to a folded configuration;

said flexible body in said folded configuration forming a passage running therethrough, from said first end of said body to said second end of said body;

said passage configured for positioning of a rope therein;

said elongated fibers positioned in said interior cavity when placed in a communication with a moving cutting chain of a chainsaw which has severed said flexible material forming said first side surface or said second side surface of said body, forming one or a plurality of clogging engagements with said cutting chain, whereby each said clogging engagement prevents further movement of said cutting chain; and sewing of portions of said body to each other forming said body to said folded configuration in a tube shape.

3. A rope severing guard apparatus, comprising:

a body, said body having a first side surface formed of flexible material and a second side surface formed of said flexible material opposite the first side surface;

an interior cavity formed between said first side surface and said second side surface;

said interior cavity extending for a length in-between a first end of said flexible body and a second end of said flexible body;

said interior cavity filled with a plurality of elongated fibers;

said flexible body positionable to a folded configuration;

said flexible body in said folded configuration forming a passage running therethrough, from said first end of said body to said second end of said body;

said passage configured for positioning of a rope therein;

said elongated fibers positioned in said interior cavity when placed in a communication with a moving cutting chain of a chainsaw which has severed said flexible material forming said first side surface or said second side surface of said body, forming one or a plurality of clogging engagements with said cutting chain, whereby each said clogging engagement prevents further movement of said cutting chain; and said plurality of elongated fibers each connected to a flexible scrim.

4. The rope severing guard apparatus of claim 3, additionally comprising:

said plurality elongated fibers positioned in a plurality of layers of said elongated fibers, each said layer being adjacent a said flexible scrim.

5. The rope severing guard apparatus of claim 4, additionally comprising:

at least some of said plurality of elongated fibers formed as loops having both a first end thereof and a second end thereof engaged to said flexible scrim.

6. The rope severing guard apparatus of claim 3, additionally comprising:

at least some of said plurality of elongated fibers formed as loops having both a first end thereof and a second end thereof engaged to said scrim.

* * * * *